(12) United States Patent
Majumder et al.

(10) Patent No.: US 10,458,389 B2
(45) Date of Patent: Oct. 29, 2019

(54) PROFILE WEDGE FOR ATTACHMENT OF AN AEROSHELL EXTENDER PIECE

(71) Applicant: LM WP PATENT HOLDING A/S, Kolding (DK)

(72) Inventors: Utsa Majumder, Bangalore (IN); Aanchal Saini, New Delhi (IN); Jesper Hasselbalch Garm, Kolding (DK); Gurli Rask Nielsen, Kolding (DK); Peter Quiring, Rodding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 297 days.

(21) Appl. No.: 15/324,597

(22) PCT Filed: Jul. 14, 2015

(86) PCT No.: PCT/EP2015/066059
§ 371 (c)(1),
(2) Date: Jan. 6, 2017

(87) PCT Pub. No.: WO2016/008881
PCT Pub. Date: Jan. 21, 2016

(65) Prior Publication Data
US 2017/0204834 A1    Jul. 20, 2017

(30) Foreign Application Priority Data

Jul. 14, 2014 (EP) ..................................... 14176874

(51) Int. Cl.
*F03D 1/06* (2006.01)
(52) U.S. Cl.
CPC ......... *F03D 1/0675* (2013.01); *F03D 1/0633* (2013.01); *F05B 2230/50* (2013.01);
(Continued)

(58) Field of Classification Search
CPC ................. F03D 1/0675; F03D 1/0633; F05B 2280/4003; F05B 2230/50;
(Continued)

(56) References Cited

U.S. PATENT DOCUMENTS 9,216,821 B1 * 12/2015 Holemans ............. B64C 27/467
10,060,274 B2 * 8/2018 Corten .................. F03D 1/0633
(Continued)

FOREIGN PATENT DOCUMENTS

EP      1 338 793 A2    8/2003
WO   2010/043647 A2    4/2010
(Continued)

OTHER PUBLICATIONS

International Search Report dated Sep. 18, 2015 issued in corresponding International Application No. PCT/EP2015/066059.

*Primary Examiner* — Joseph J Dallo
(74) *Attorney, Agent, or Firm* — Nath, Goldberg & Meyer; Tanya E. Harkins

(57) ABSTRACT

A wind turbine blade assembly comprising a wind turbine blade having a tip end and a root end, and a leading edge and a trailing edge with a chord length extending therebetween is described. The wind turbine blade assembly further comprises an aeroshell extender piece comprising a body for attachment to a trailing edge side of a profile of a wind turbine blade, the body having a first end for attachment to the trailing edge side of the profile, and a second trailing edge end to form an extended airfoil trailing edge profile for a portion of the profile of the wind turbine blade. The aeroshell extender piece is attached to the wind turbine blade at least partly using at least one profile wedge, said at least one profile wedge being shaped to compensate for the geometry of the wind turbine blade.

16 Claims, 8 Drawing Sheets

(52) U.S. Cl.
CPC ..... *F05B 2230/60* (2013.01); *F05B 2240/221* (2013.01); *F05B 2260/96* (2013.01); *F05B 2280/4002* (2013.01); *F05B 2280/4003* (2013.01); *F05B 2280/6003* (2013.01); *Y02E 10/721* (2013.01); *Y02P 70/523* (2015.11)

(58) Field of Classification Search
CPC ............ F05B 2240/221; F05B 2230/60; F05B 2280/6003; F05B 2280/4002; F05B 2260/96; Y02E 10/721; Y02P 70/523
See application file for complete search history.

(56) References Cited

U.S. PATENT DOCUMENTS

| | | | |
|---|---|---|---|
| 2012/0134836 A1* | 5/2012 | Carroll | F03D 1/0633 416/223 R |
| 2017/0234296 A1* | 8/2017 | Garm | F03D 1/0675 428/137 |

FOREIGN PATENT DOCUMENTS

| | | |
|---|---|---|
| WO | 2011/157849 A2 | 12/2011 |
| WO | 2013/092852 A1 | 6/2013 |

* cited by examiner

PROFILE WEDGE FOR ATTACHMENT OF AN AEROSHELL EXTENDER PIECE

This is a National Phase Application filed under 35 U.S.C. 371 as a national stage of PCT/EP2015/066059, filed Jul. 14, 2015, an application claiming the benefit of European Application No. 14176874.7, filed Jul. 14, 2014, the content of each of which is hereby incorporated by reference in its entirety.

FIELD OF THE INVENTION

The present invention relates to a wind turbine blade assembly comprising a wind turbine blade and an aeroshell extender piece. The invention further relates to an associated method of manufacture.

BACKGROUND OF THE INVENTION

Aerodynamic shells, also called aeroshells or fairings, can be used in an effort to present a more aerodynamic airfoil profile for sections of wind turbine blades. International Patent Application Publication WO 2013/092852 shows a wind turbine blade assembly wherein a blade part is mounted on a cylindrical blade extender part, with an aeroshell used to effectively convert the cylindrical extender into a blade portion having an airfoil profile.

However, while the use of such aeroshells can improve aerodynamic performance of a wind turbine blade section, they can also introduce additional complications with regard to the distribution of stresses and strains in the general wind turbine blade structure. In particular, the extended trailing edge formed by the end of the aeroshell section is regularly subjected to relatively high stress levels during wind turbine operation. Accordingly, increased levels of reinforcement material are required to prevent failure of the aeroshell, which increases the eventual weight and cost of wind turbine blades utilising such aeroshells.

WO 2011/157849 discloses a blade provided with a pre-manufactured trailing edge part for an outboard part of the blade. In one embodiment, the pre-manufactured part is provided with channels formed in the surface of the part having a depth of 0 to 10 mm with the purpose of minimising noise.

EP 1 338 793 discloses a blade provided with trailing edge serrations at an outboard part of the blade in order to minimise noise emissions.

WO 2010/043647 discloses a blade provided with a number of trailing edge sections, such as trailing edge flaps, along an outboard part of the blade, and which are individually controllable.

It is an object of the invention to provide an aeroshell construction which is relatively flexible, and which is arranged to better withstand operational stresses and strains when installed as part of a wind turbine blade construction.

SUMMARY OF THE INVENTION

Accordingly, there is provided a wind turbine blade assembly comprising a wind turbine blade having a tip end and a root end, and a leading edge and a trailing edge with a chord length extending therebetween,
wherein the wind turbine blade assembly further comprises an aeroshell extender piece comprising:
a body for attachment to a trailing edge side of a profile of the wind turbine blade, the body having a first end for attachment to the trailing edge side of the profile, and a second trailing edge end to form an extended airfoil trailing edge profile for a portion of the profile of the wind turbine blade, wherein
the aeroshell extender piece is attached to the wind turbine blade at least partly using at least one profile wedge, said at least one profile wedge is shaped to compensate for the geometry of the wind turbine blade.

By "compensate for the geometry" is meant that the profile wedge locally changes the geometry of the blade so as to provide a better attachment surface for the body of aeroshell extender piece. Thereby strains or loads on the connection between the aeroshell extender piece and the wind turbine blade may be reduced.

The profile wedges are preferably provided as longitudinally extending pieces having a substantially wedge shaped cross-section.

The profile wedge is advantageously arranged between the aeroshell extender piece and the wind turbine blade, such that it is tapered in direction towards the leading edge of the blade. Thus, the profile wedge changes the attachment surface to a lower angle compared to an attachment directly on the wind turbine, which in turn provides a simple method of lower strain or loads on the connection.

In an advantageous embodiment, the aeroshell extender piece is attached to the wind turbine blade via two profile wedges.

The profile wedge advantageously comprises an inner attachment surface for attachment to the surface of wind turbine blade and an outer surface for attachment to the aeroshell extender.

In a first advantageous embodiment, the inner attachment surface has a first radius of curvature and the outer attachment surface has a second radius of curvature, wherein the first radius of curvature is smaller than the second radius of curvature. Accordingly, the profile wedge provides a more even surface for the attachment, which in particular for glue bonds lowers strain or loads on the connection.

In a second advantageous embodiment, the outer attachment surface has a larger surface than the inner attachment surface. Thus, the profile wedge increase the bond surface, which in turn provides a stronger glue bond between the aeroshell extender piece and the wind turbine blade.

In a third advantageous embodiment, the outer attachment surface is substantially planar or flat.

The inboard part or portion of the blade preferably has a substantially cylindrical part, e.g. having a circular, elliptical or oval cross-section. The inboard part or portion of the blade may preferably be formed as a load-carrying structure of the blade, and may further advantageously be formed as a blade extender, e.g. for a assembled blade having an inboard extender part and an outboard blade part.

The inboard part or portion of the blade advantageously extends along less than 40% and preferably less than 35% of the total length of the blade. Accordingly, the extender piece is adapted to be arranged within the inner 40% or 35% of the blade as seen from a root end of the blade.

In one advantageous embodiment, the inboard part is a blade extender.

In another advantageous embodiment, the profile wedge is integrally formed with the wind turbine blade.

The profile wedge is advantageously formed as a composite structure, e.g. a core material, such as balsawood or foamed polymer wrapped in a fibre reinforcement skin.

In one embodiment, the body comprises a plurality of slits extending from said second trailing edge end to a point located towards said first end.

According to the invention, the aeroshell extender piece is preferably adapted to be fitted to an inboard portion of a profile of a wind turbine blade.

The inboard part or portion of the blade preferably has a substantially cylindrical part, e.g. having a circular, elliptical or oval cross-section. The inboard part or portion of the blade may preferably be formed as a load-carrying structure of the blade, and may further advantageously be formed as a blade extender, e.g. for an assembled blade having an inboard extender part and an outboard blade part.

Providing a slitted or slotted extender piece allows for a degree of flexibility in the structure of the extender piece, reducing the level of strain which is experienced along the trailing edge end of the extender piece. It will be understood that the extender piece comprises an aeroshell or fairing, used to provide for an improved aerodynamic profile of a portion of a wind turbine blade.

Preferably, said plurality of slits are formed wherein the dimensions of said slits do not significantly impact aerodynamics in area of extender piece. The slits are arranged to be aerodynamically insignificant for the normal operation of the wind turbine blade. It will be understood that aerodynamically insignificant is held to mean that the dimensions of the slits are small relative to what would be required to affect the aerodynamic performance of the wind turbine blade profile, e.g. in respect of noise, lift/drag, etc.

The extender piece may advantageously be provided as a uniform structure. The extender piece may further be provided as a passive device, i.e. as a structure without active parts for controlling the aerodynamic shape of the blade.

The inboard part or portion of the blade advantageously extends along less than 40% and preferably less than 35% of the total length of the blade. Accordingly, the extender piece is adapted to be arranged within the inner 40% or 35% of the blade as seen from a root end of the blade.

In a first aspect, the width of each slit is less than the boundary layer height in the area of the slit. In a second aspect, the width of each slit is less than the height of the laminar sublayer in the area of the slit.

Preferably, the plurality of slits define a gap between opposed edges of the slits, wherein the width of said gap is less than 50 mm, further preferably less than 25 mm. In one embodiment, the slits have a gap width of approximately 15 mm.

Additionally or alternatively, the aeroshell extender piece comprises a flexible material which is provided in or over the gaps defined by said plurality of slits. The flexible material may comprise any suitable material which is operable to cover or seal the gaps without significantly affecting the structural properties of the aeroshell extender piece, e.g. rubber, a flexible plastics material, canvas, etc.

Additionally or alternatively, the aeroshell extender piece comprises brushes or bristles provided at the gaps defined by said plurality of slits. The use of bristles or brushes at the slits can act to cover the gaps defined by the slits, and reduce any negative aerodynamic effects which may result by the presence of the slits at the trailing edge.

Preferably, said plurality of slits are formed along at least 50% of the depth or chordwise length of the body of the aeroshell extender piece from said trailing edge end towards said first end, preferably between 50-90% of the depth of the body from said trailing edge end towards said first end, preferably approximately 80% of the depth of the body from said trailing edge end towards said first end.

Preferably, the aeroshell extender piece comprises a pressure-side panel to form a pressure side of the extended airfoil trailing edge profile and a suction-side panel to form a suction side of an extended airfoil trailing edge profile, wherein the aeroshell extender piece further comprises reinforcing elements located internally of the body of the extender piece, preferably extending between said pressure- and suction-side panels.

It will be understood that the aeroshell extender piece may comprises a pressure-side panel having a relatively concave external surface, to form a section of an external pressure-side surface of a trailing edge profile. Additionally or alternatively, it will be understood that the aeroshell extender piece may comprises a suction-side panel having a relatively convex external surface, to form a section of an external suction-side surface of a trailing edge profile.

Preferably, said reinforcing elements comprise bulkhead panels, preferably aligned with a chordwise direction of the extender piece. It will be understood that apertures may be provided in said bulkhead panels, e.g. to provide for drainage, pressure equalization, etc.

Preferably, the reinforcing elements are arranged wherein a reinforcing element is positioned adjacent each slit of said plurality of slits, further preferably, the reinforcing elements are arranged wherein a pair of reinforcing elements are positioned adjacent the slits of said plurality of slits, the pair of reinforcing elements positioned either side of the slit.

By positioning the reinforcing elements or bulkheads either side of the slits, accordingly the aeroshell extender piece is arranged as a plurality of sections along the length of the wind turbine blade portion.

Preferably, said plurality of slits are spaced from each other along the spanwise length of the extender piece.

Preferably, said plurality of slits are spaced with approximately 1-5 meters between adjacent slits, further preferably approximately 2-3 meters between adjacent slits.

In one aspect, the wind turbine blade comprises an outboard blade part and an inboard extender part, wherein said aeroshell extender piece is arranged along a portion of the inboard extender part.

It will be understood that the outboard blade part may be pitchable relative to the inboard extender part, e.g. using a blade pitch mechanism provided at the outer end of the inboard extender part.

Preferably, the inboard extender part comprises a substantially cylindrical blade extender.

By providing an aeroshell extender piece to provide an extended trailing edge of a cylindrical blade extender, the aerodynamic performance of the inboard blade extender can be improved.

Preferably, the aeroshell extender piece is attached to the wind turbine blade at least partly using at least one profile wedge, said at least one profile wedge shaped to compensate for the geometry of the wind turbine blade.

Preferably, the at least one profile wedge is shaped to provide a substantially planar bonding surface for the aeroshell extender piece.

It will be understood that the wind turbine blade may comprise a shaped or curved surface, wherein the profile wedges are shaped to correspond to said shaped or curved surface.

Where the extender piece is attached to a substantially cylindrical blade extender, preferably the profile wedges comprise a first planar surface to attach to the extender piece and a second concavely-curved surface to attach to the blade extender.

There is further provided a wind turbine comprising a wind turbine blade or wind turbine blade assembly as described in any of the above embodiments.

There is further provided a method of assembly of a wind turbine blade portion having a trailing edge extension, the method comprises the steps of:
- providing a wind turbine blade portion having a leading edge side and a trailing edge side;
- providing a pressure-side panel of an aeroshell extension piece;
- providing a suction-side panel of an aeroshell extension piece;
- attaching a first profile wedge to a first side of said wind turbine blade portion;
- attaching a first of said pressure- and suction-side panels to said wind turbine blade portion at least partly using said first profile wedge;
- attaching a second profile wedge to a second side of said wind turbine blade portion; and
- attaching a second of said pressure- and suction-side panels to said wind turbine blade portion at least partly using said second profile wedge, wherein said pressure- and suction-side panels form an aeroshell trailing edge extension for said wind turbine blade portion.

Preferably, the method further comprises the step of attaching reinforcing elements to said first of said panels, preferably said reinforcing elements comprise bulkhead panels.

Preferably, said step of attaching a second of said pressure- and suction-side panels comprises attaching said second panel to said reinforcing elements.

Preferably, the method further comprises the step of cutting said aeroshell trailing edge extension from a trailing edge end to a point located towards said wind turbine blade portion.

There is also provided a method of manufacturing an aeroshell extender piece for a portion of a profile of a wind turbine blade, the method comprising the steps of:
- providing a consolidated aeroshell extender piece for attachment to a trailing edge of a portion of a wind turbine blade, preferably an inboard part of the wind turbine blade, the extender piece having a first end for attachment to the trailing edge of said profile, and a second trailing edge end to form an extended airfoil trailing edge profile for the portion of the profile of the wind turbine blade; and
- providing a plurality of slits in said consolidated aeroshell extender piece, each of said plurality of slits extending from said second trailing edge end to a point located towards said first end.

Preferably, said step of providing slits comprises performing cuts in said consolidated extender piece from said trailing edge end towards said first end.

Preferably, the step of providing a consolidated extender piece comprises forming an extender body through an infusion moulding process.

Preferably, said slits are formed wherein the dimensions of the slits do not significantly impact aerodynamic performance in the area of the aeroshell extender piece. The slits are arranged to be aerodynamically insignificant for the normal operation of the wind turbine blade. It will be understood that aerodynamically insignificant is to be held to mean that the dimensions of the slits are small relative to what would be required to affect the aerodynamic performance of the wind turbine blade profile, e.g. in respect of noise, lift/drag, etc.

In a first aspect, the step of performing cuts is configured wherein the width of each slit formed by the cutting is less than boundary layer height in the area of each slit. In a second aspect, the width of each slit is less than height of laminar sublayer in the area of each slit, preferably at the design point of the wind turbine blade.

Preferably, the step of performing cuts is configured wherein the slits have a gap between opposed edges of the slit of less than 50 mm, preferably less than 25 mm. In one embodiment, the slits have a gap width of approximately 15 mm.

Preferably, the method comprises the step of arranging a flexible material in or over the gaps defined by said plurality of slits, and/or brushes or bristles provided at the gaps defined by said plurality of slits. The flexible material and/or brushes or bristles may comprise any suitable material which is operable to cover or seal the gaps without significantly affecting the structural properties of the aeroshell extender piece, e.g. rubber, a flexible plastics material, canvas, etc.

Preferably, the step of performing cuts is arranged wherein said plurality of slits are made along at least 50% of depth or chordwise length of the consolidated extender piece from the trailing edge end towards the first end, preferably between 50-90% of the depth of consolidated extender piece from the trailing edge end towards the first end, preferably approximately 80% of the depth of the consolidated extender piece from the trailing edge end towards the first end.

Preferably, the step of performing cuts comprises forming, preferably drilling, at least one aperture in said consolidated extender piece, preferably a substantially circular aperture, and cutting the body of said consolidated extender piece from the trailing edge end to said at least one aperture.

Alternatively, the step of forming at least one aperture may be done when the consolidated extender piece is manufactured, e.g. through the use of inserts during a moulding process.

Preferably, the method comprises the step of providing a flexible material and/or brushes or bristles on or over said at least one aperture.

Preferably, the step of performing cuts or slits is configured wherein the slits on the body of the aeroshell extender piece are spaced from each other along the spanwise length of the extender piece.

Preferably, the slits are spaced with approximately 1-5 meters between adjacent slits, further preferably approximately 2-3 meters between adjacent slits.

Preferably, the step of providing a consolidated aeroshell extender piece comprises:
- providing a pressure-side panel and providing a suction-side panel, the panels forming a body;
- providing reinforcing elements internal of the body of the aeroshell extender piece, the reinforcing elements extending between opposed pressure- and suction-side panels.

Preferably, the reinforcing elements comprise bulkhead elements.

Preferably the steps of providing pressure-side and suction-side panels comprises providing sandwich panels.

Preferably, the aeroshell extender piece is attached to the wind turbine blade profile at least partly using profile wedges, wherein said profile wedges are shaped to provide substantially planar bonding surfaces for the aeroshell extender piece. The profile wedges are preferably provided as longitudinally extending pieces having a substantially wedge shaped cross-section.

It will be understood that the wind turbine blade profile comprises a shaped or curved surface, wherein said profile wedges are shaped to correspond to said shaped or curved surface.

Preferably, the wind turbine blade profile comprises a substantially cylindrical blade extender. In this case, the profile wedges preferably comprise a planar surface to attach to said extender piece and a concavely-curved surface to attach to a surface of said cylindrical blade extender.

There is further provided a method of manufacturing an aeroshell extender piece for a portion of a profile of a wind turbine blade, the method comprising the steps of:
  providing a pressure-side panel;
  providing a suction-side panel;
  attaching a plurality of reinforcing elements to a first of said pressure- and suction-side panels; and
  attaching a second of said pressure- and suction-side panels to said plurality of reinforcing elements and to said first panel to form a consolidated aeroshell extender piece.

Preferably, the consolidated aeroshell extender piece comprises a first end to be attached to a portion of a wind turbine blade and a second trailing edge end to form an extended airfoil trailing edge profile for the portion of the profile of the wind turbine blade, wherein the method comprises the step of cutting said consolidated aeroshell extender piece from said second trailing edge end to a point located towards said first end to provide a plurality of slits in the body of the aeroshell to form a flexible aeroshell extender piece.

Preferably, said plurality of reinforcing elements comprise bulkhead panels.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
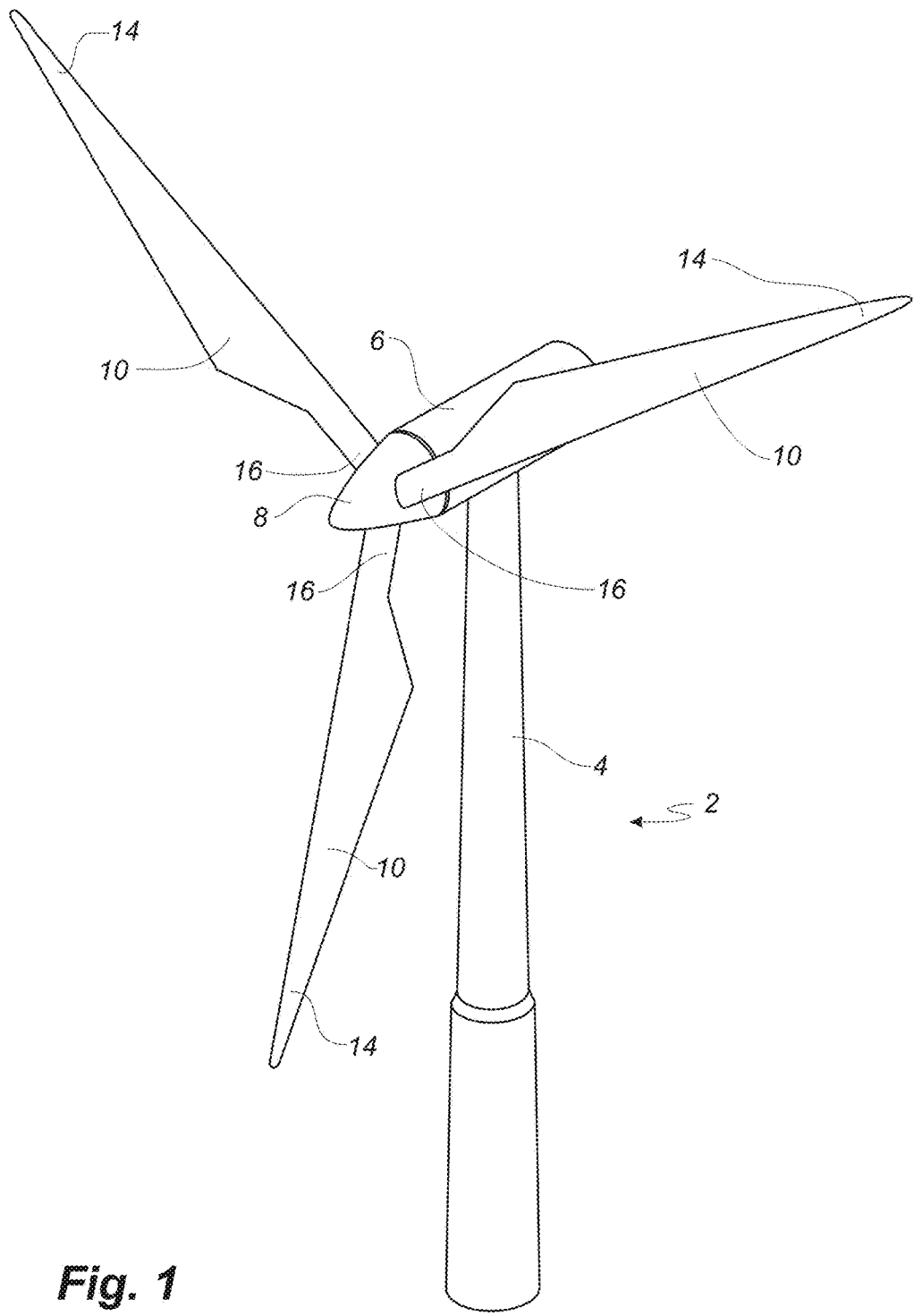
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
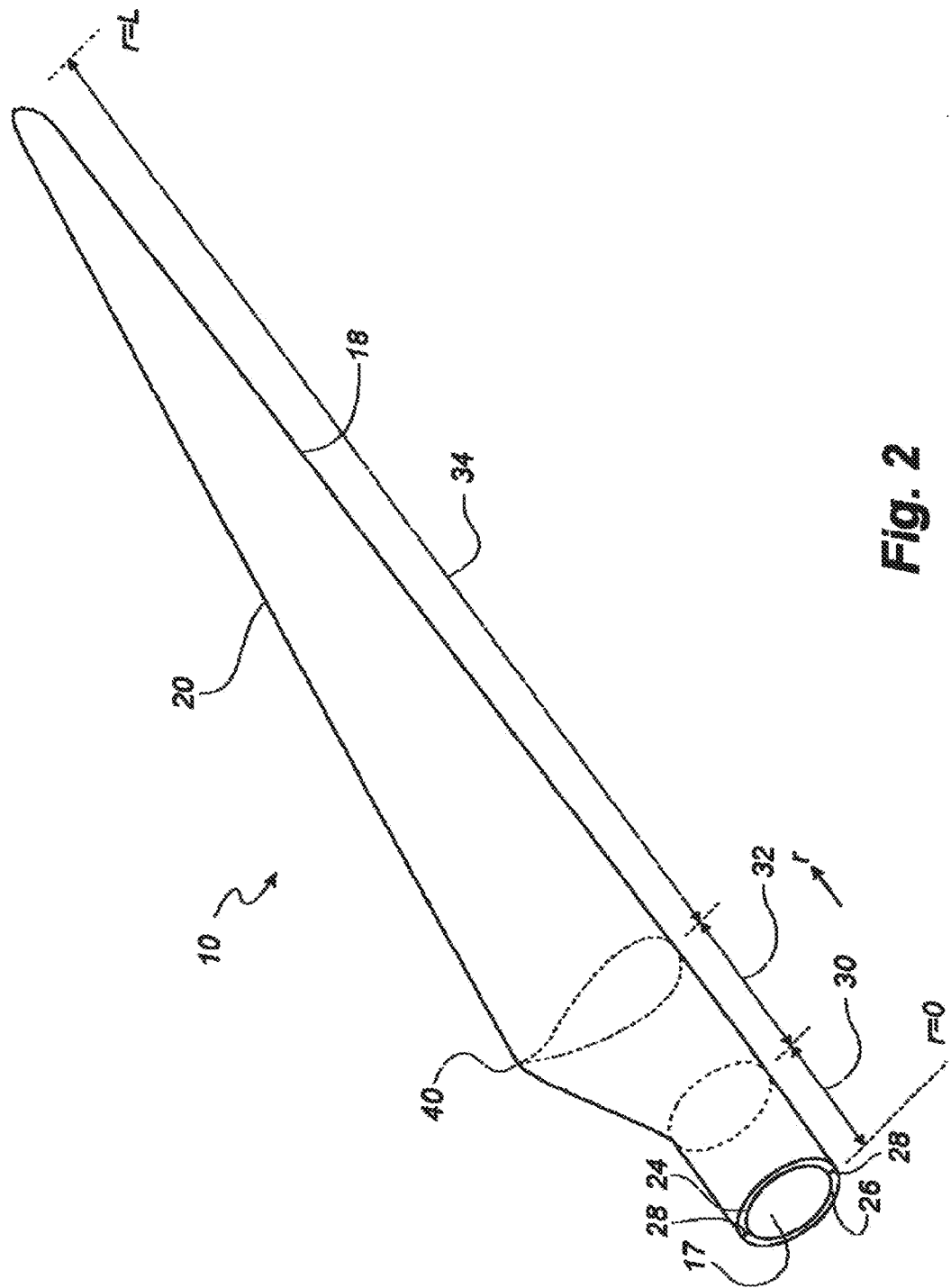
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
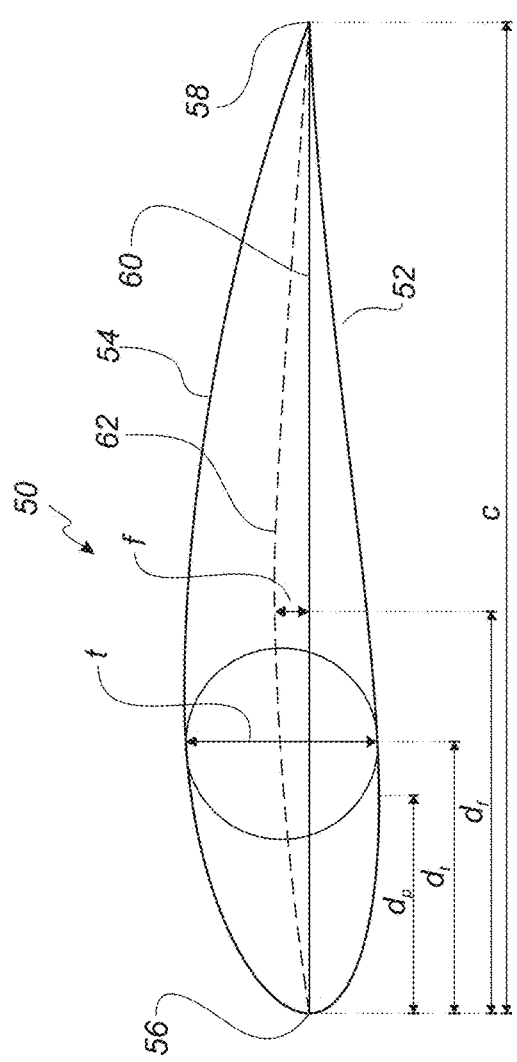
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
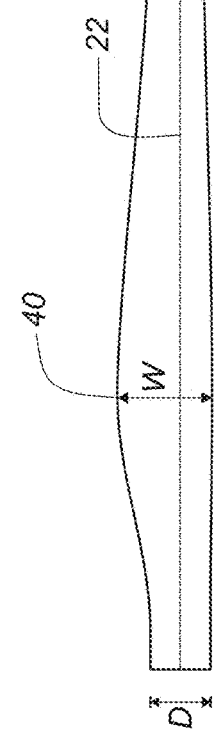
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position r=$L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

The wind turbine blade 10 comprises a flexible aeroshell extender piece attached to a portion of the blade to provide for an adjusted aerodynamic profile of the portion of the blade. The aeroshell extender piece is preferably used to provide an extended trailing edge profile for the portion of the blade.

In a particularly advantageous embodiment, the wind turbine blade is formed as a wind turbine blade assembly, comprising an outboard blade part and an inboard blade part, the inboard blade part comprising a blade extender and an aeroshell extender piece provided on the blade extender to form an extender trailing edge, for example, as described in International Patent Application Publication No. WO 2013/092852.

In FIGS. 5-9, a method of manufacturing an aeroshell extender piece according to an embodiment of the invention is illustrated.

Figure 5:
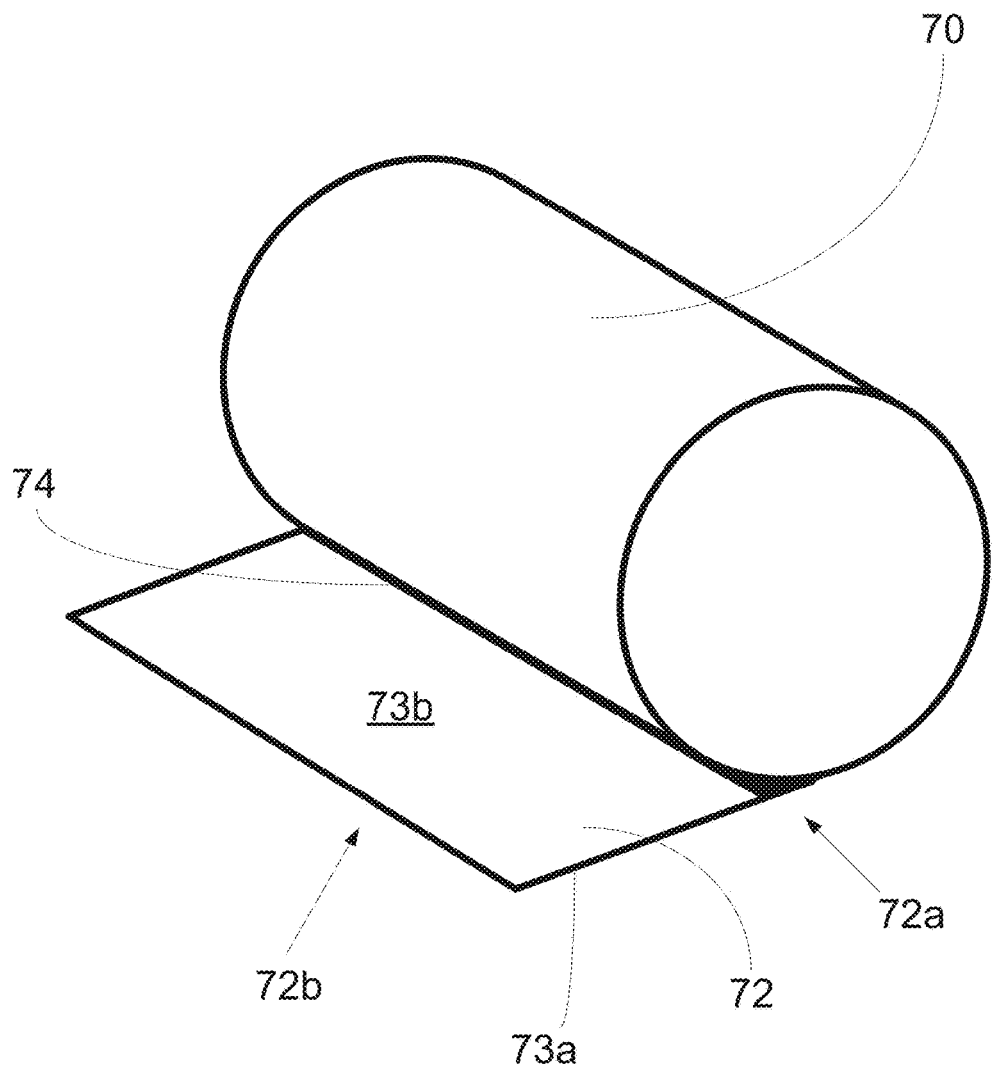
FIGS. 5-8 illustrates a isometric perspective view of a series of step for a method of manufacturing a flexible aeroshell extender piece according to an aspect of the invention.

With reference to FIG. 5, a cylindrical blade extender 70 or root end portion of a blade is provided. The blade extender 70 may be formed from any suitable material, e.g. a metallic extender formed from steel or another metal material, or an extender formed as a fibre-composite structure, e.g. using glass- and/or carbon-fibres suspended in a matrix of cured resin. It will be understood that, in alternative embodiments, the blade extender may be provided as having an elliptical or asymmetric cross-sectional profile.

A first extender panel 72 is provided to form a first external surface of an aeroshell extender piece. The first panel 72 comprises an externally-facing surface 73*a* which is used to form a portion of the external surface of the extended trailing edge of the aeroshell extender piece, and an opposed internally-facing surface 73*b*.

Figure 9:
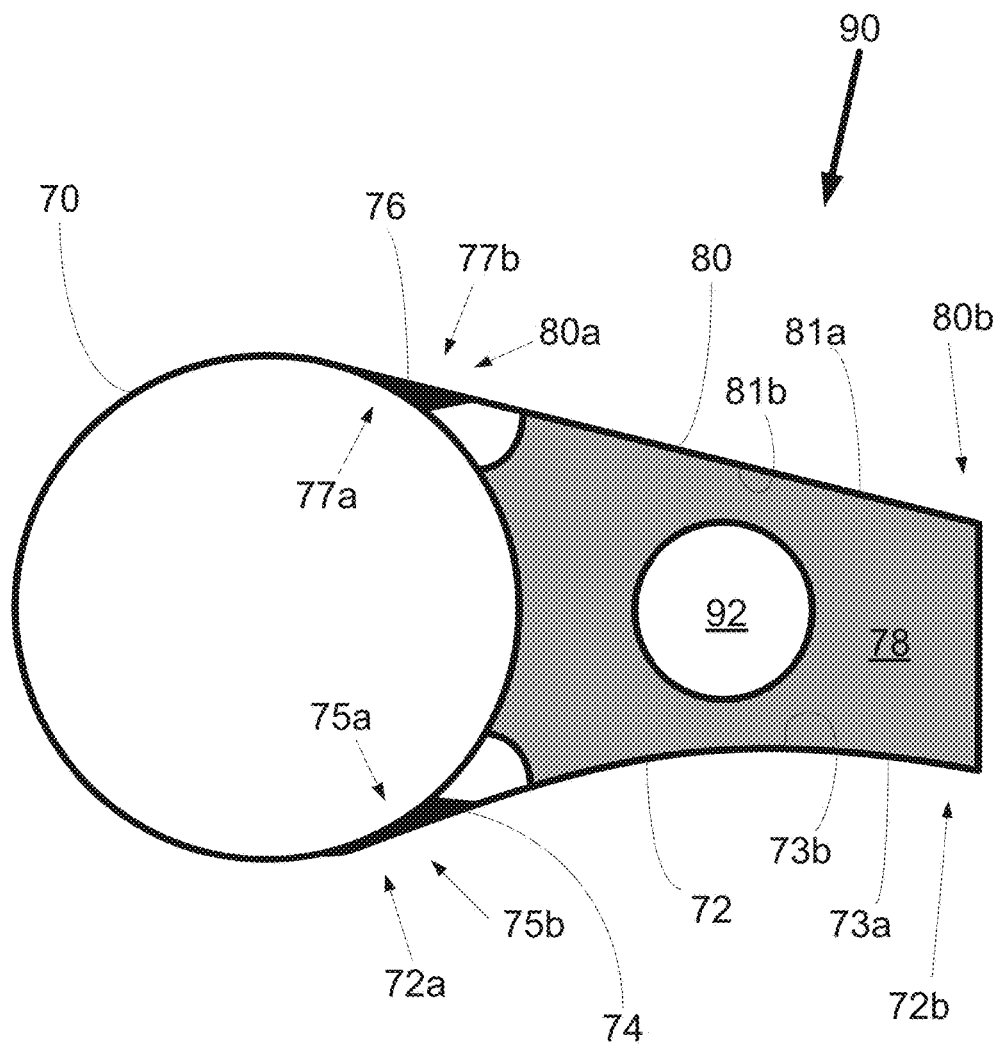
FIG. 9 illustrates a cross-sectional view of a wind turbine blade portion having an aeroshell extender piece according to an aspect of the invention.

With reference to FIGS. 5 & 9, a first profile wedge 74 is provided for the attachment of the first extender panel 72 to a surface of the cylindrical blade extender 70. The first profile wedge 74 is used to present a suitable attachment surface, e.g. an adhesive bonding surface, to allow for ease of attachment of the first extender panel 72 to the blade extender 70. The first profile edge 74 may comprise an extended body arranged to extend along the longitudinal direction of the blade extender 70 to which it is desired to attach an aeroshell extender, and/or the profile wedge 74 may comprise a plurality of wedge elements which are attached at locations along the length of the extender 70.

The wedge 74 comprises a first shaped surface 75*a* for attachment of the wedge 74 to the surface of the blade extender 70, wherein the first shaped surface 75*a* is shaped to correspond to the surface profile of the blade extender 70. For example, in the embodiment of FIG. 5 the wedge 74 may comprise a singly curved surface 75*a* for attachment to the curved surface of the cylindrical extender 70, but it will be understood that the profile wedge 74 may comprise a doubly curved surface for attachment to the surface of relatively more complex structures, e.g. a transition region of a wind turbine blade. The wedge 74 further comprises a second planar surface 75*b* located opposite to said first shaped surface 75*a*, wherein the wedge 74 is arranged such that the second planar surface 75*b* presents a relatively flat planar surface, suitable for an adhesive bonding surface.

The first shaped surface 75*a* of the profile wedge 74 is attached to the surface of the blade extender 70, preferably using an adhesive bond, but any other suitable attachment methods may be used, e.g. bolting, riveting, etc. Accordingly, the second surface 75*b* of the profile wedge 74 presents a bonding surface to which a first end 72*a* of the first extender panel 72 can be attached, preferably using an adhesive bond, but any other suitable attachment methods may be used, e.g. bolting, riveting, etc. Accordingly, FIG. 5 presents a blade extender 70 having a first extender panel 72 of an aeroshell extender piece attached via a first profile wedge 74, the first extender panel 72 attached to the profile wedge 74 at a first end 72*a* of the panel 72, with a second trailing edge end 72*b* of the panel 72 projecting distal from the extender 70.

Figure 6:
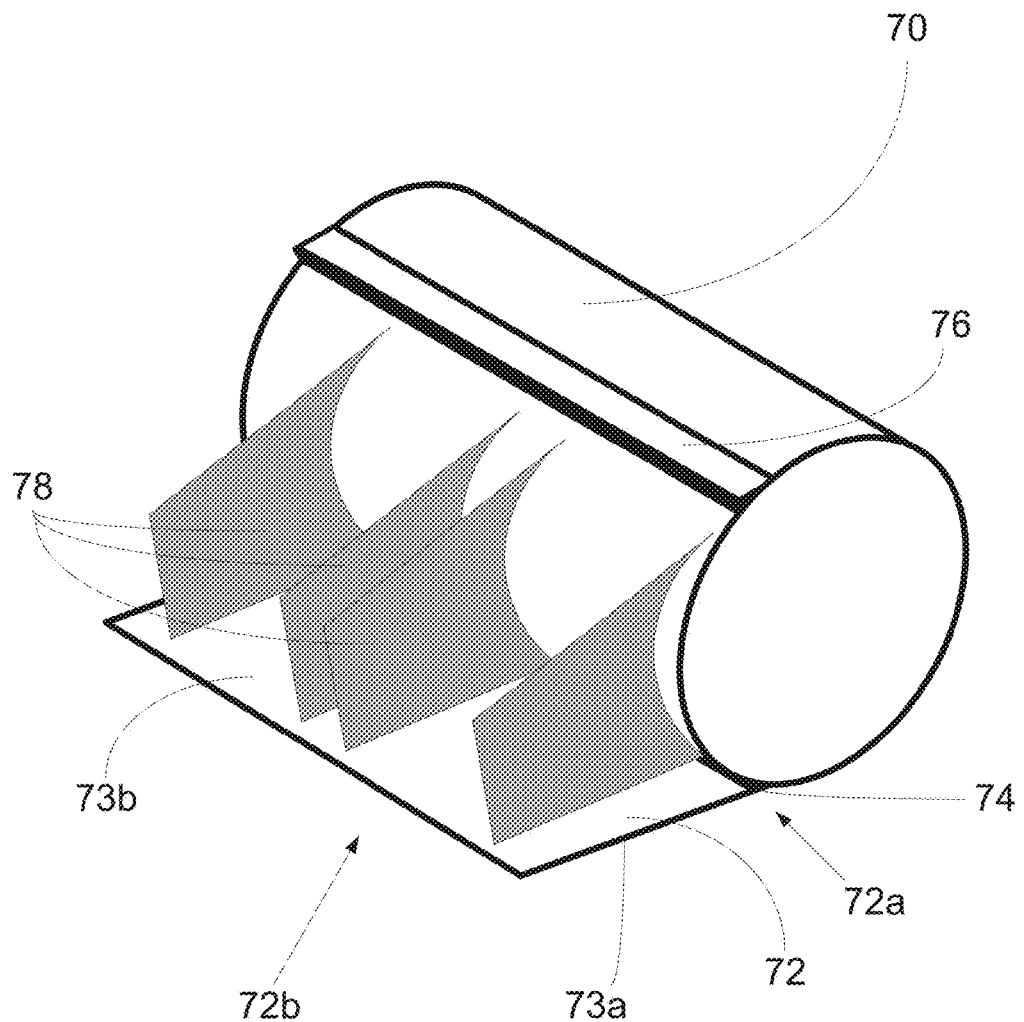

In FIG. 6, a second profile wedge 76 is attached at the opposite side of the blade extender 70 to the first profile wedge 74. Similar to the first profile wedge 74, the second profile edge 76 may comprise an extended body arranged to extend along the longitudinal direction of the blade extender 70 to which it is desired to attach an aeroshell extender, and/or the profile wedge 76 may comprise a plurality of wedge elements which are attached at locations along the length of the extender 70.

With reference to FIG. 9, the second wedge 76 comprises a first shaped surface 77*a* for attachment of the wedge 76 to the surface of the blade extender 70, wherein the first shaped surface 77*a* is shaped to correspond to the surface profile of the blade extender 70. For example, in the embodiment of FIG. 5 the wedge 76 may comprise a singly curved surface 77*a* for attachment to the curved surface of the cylindrical extender 72, but it will be understood that the second profile wedge 76 may comprise a doubly curved surface for attachment to the surface of relatively more complex structures, e.g. a transition region of a wind turbine blade. The wedge 76 further comprises a second planar surface 77*b* located opposite to said first shaped surface 77*a*, wherein the wedge 76 is arranged such that the second planar surface 77*b* presents a relatively flat planar surface, suitable for an adhesive bonding surface. The first shaped surface 77*a* of the profile wedge 76 is attached to the surface of the blade extender 70, preferably using an adhesive bond, but any other suitable attachment methods may be used, e.g. bolting, riveting, etc.

A plurality of reinforcing elements 78 are provided which are to be attached to the internally-facing surface 73*b* of the first panel 72 and which also may be attached to the surface of the blade extender 72. The reinforcing elements 78 of FIG. 6 are provided as planar panel elements, preferably bulkhead elements. The reinforcing elements 78 may be formed as sandwich panel constructions, e.g. having a core material such as balsa or a low-density foam having an external skin layer, but it will be understood that the reinforcing elements 78 may additionally or alternatively be provided in alternate forms, e.g. as an internal truss structure, tension cables, metal plates, etc. The reinforcing elements 78 may be attached to the first panel 72 and/or to the blade extender 70 suing any suitable attachment method, preferably adhesive bonding.

Figure 7:
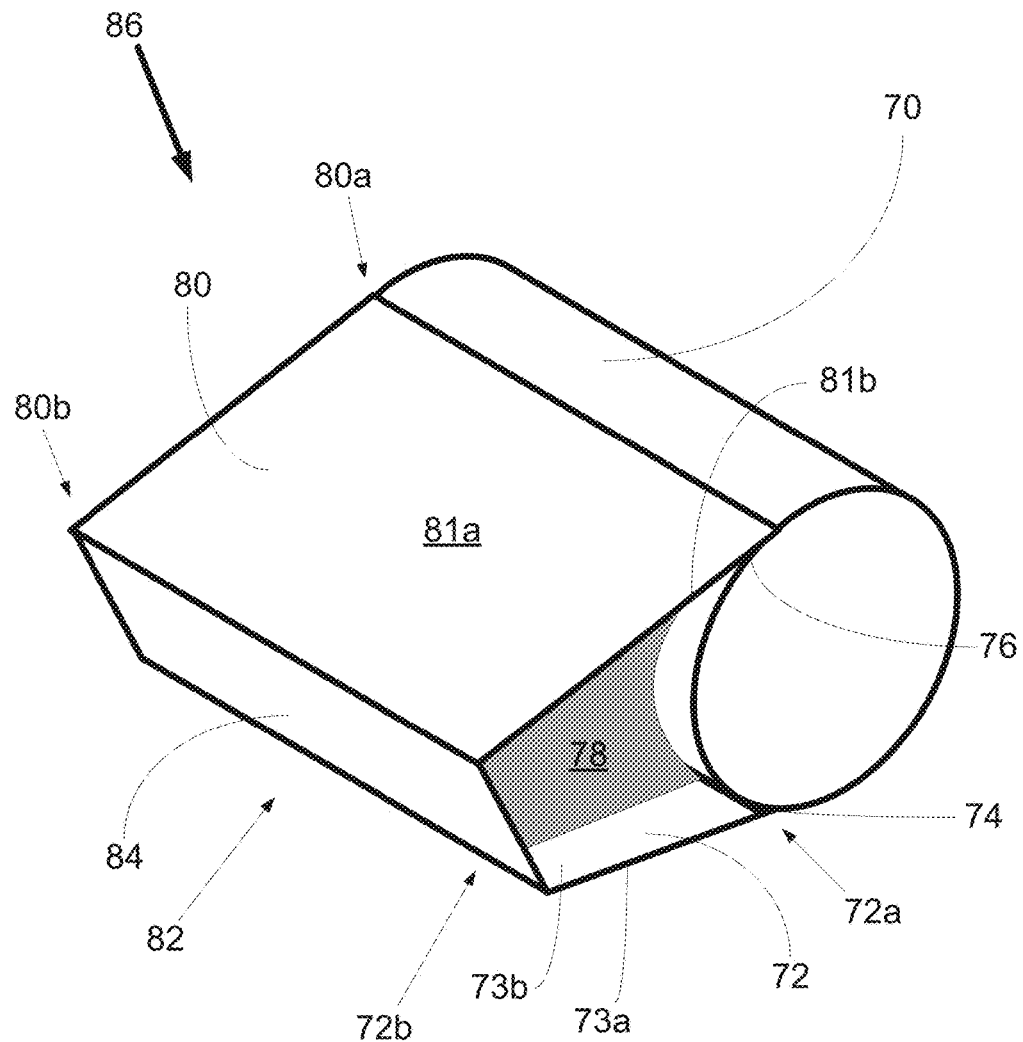

With reference to FIG. 7, a second extender panel 80 is provided to form a second external surface of an aeroshell extender piece. The second panel 80 comprises an externally-facing surface 81a which is used to form a portion of the external surface of the extended trailing edge of the aeroshell extender piece, and an opposed internally-facing surface 81b.

The second extender panel 80 is attached to the assembly by securing a first end 80a of the second panel 80 to the second surface 77b of the profile wedge 76, preferably by an adhesive bond. Accordingly, a second end 80b of the second extender panel 80 is arranged to form a trailing edge end of the second external surface of the aeroshell extender piece.

While it will be understood that the first and second panels 72,80 may be arranged such that the second trailing edge ends 72b,80b meet to form a relatively sharp trailing edge of the aeroshell extender piece, in the embodiment shown in FIG. 7 the aeroshell extender piece presents a blunt trailing edge 82, wherein a trailing edge panel 84 extends between the second trailing edge end 72b of the first extender panel 72 and the second trailing edge end 80b of the second extender panel 80. It will be understood that the trailing edge panel 84 may be provided as a separate component for attachment to the second trailing edge ends 72b,80b of the first and second panels 72,80, and/or for attachment to the plurality of reinforcing elements 78 at the trailing-edge-side 82 of the aeroshell extender piece. It will also be understood that the trailing edge panel 84 may be formed integrally with one of the first and second panels 72,80, and/or the trailing edge panel 84 may be formed by a first panel section projecting from the trailing edge end 72b of the first extender panel 72 and a second panel section projecting from the trailing edge end 80b of the second extender panel 80.

FIG. 7 illustrates a blade extender 70 having a consolidated aeroshell extender piece indicated at 86, the consolidated aeroshell extender piece 86 forming an extended trailing edge profile for the blade extender 70. The consolidated aeroshell extender piece 86 may be converted to a flexible aeroshell extender piece through providing trailing edge slits or slots in the body of the consolidated aeroshell extender piece 86.

Figure 8:
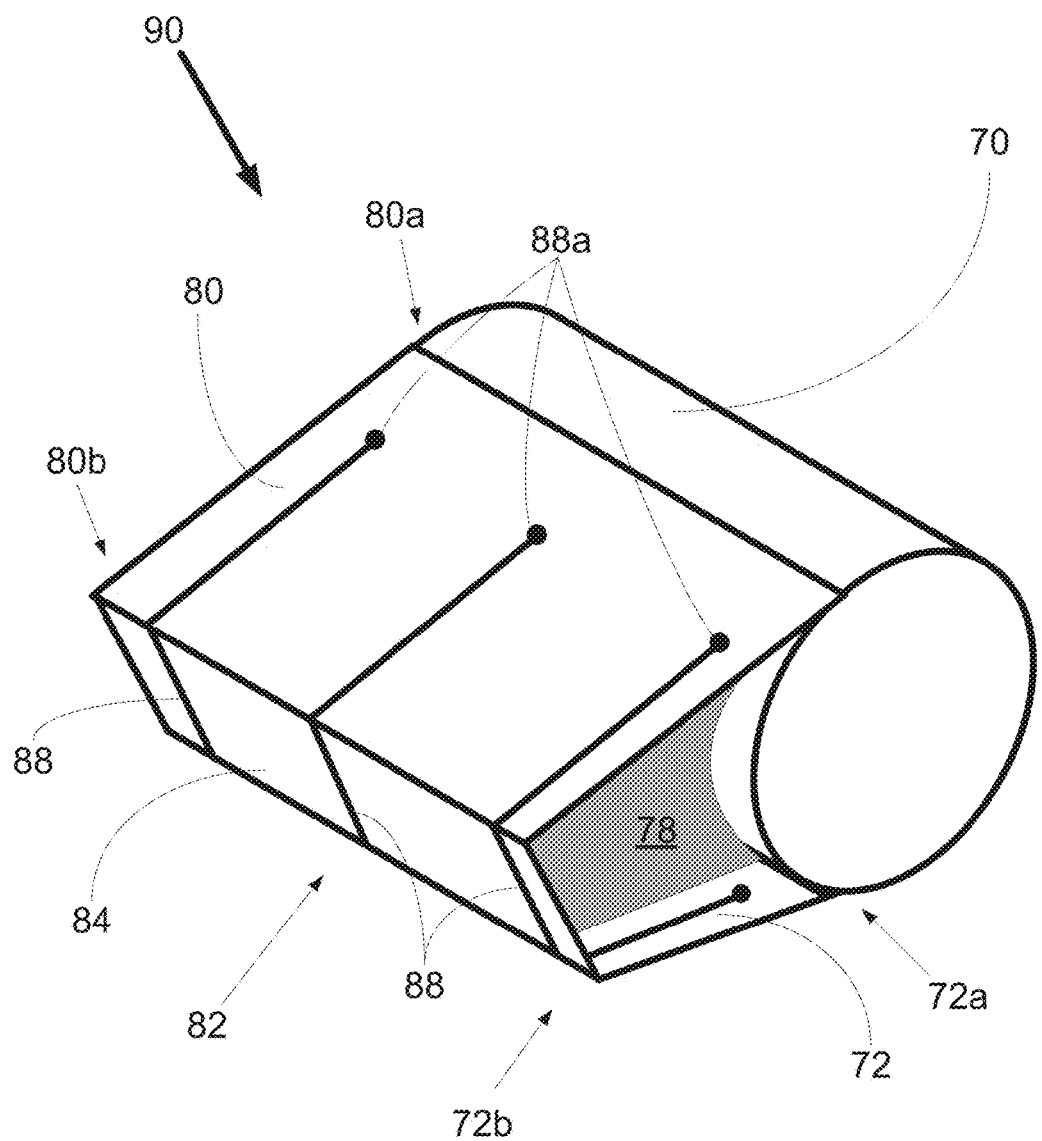

With reference to FIG. 8, a plurality of slits 88 are formed in the body of the consolidated aeroshell extender piece 86, preferably by performing cuts into the aeroshell body, in particular into the trailing edge panel 84 and the first and second extender panels 72,80 from the trailing edge 82 of the consolidated aeroshell extender piece 86. The slits 88 extend from the trailing edge 82 of the consolidated aeroshell extender piece 86, and extend to a point 88a located towards the first ends 72a,80a of the first and second panels 72,80 of the consolidated aeroshell extender piece 86. Additionally or alternatively, the slits 88 may be performed by cutting from the end points 88a of the slits 88 towards the trailing edge 82 of the consolidated aeroshell extender piece 86.

Preferably, the plurality of slits 88 are spaced with approximately 1-5 meters between adjacent slits 88, further preferably approximately 2-3 meters between adjacent slits 88.

By providing slits 88 in this manner at the trailing edge 82 of the consolidated aeroshell 86, the trailing edge 82 of the aeroshell is effectively divided into separate portions along the length of the aeroshell. Accordingly, a relatively flexible aeroshell extender piece 90 is formed, as the slitted or slotted trailing edge allows for a relative bending or flexing between separate portions of the trailing edge 82 without introducing relatively large bending stresses along the trailing edge 82. The slits 88 can allow for the aeroshell to "open", or to "close", along the spanwise direction, due to a concertina-like movement between separate sections of the aeroshell as a result of the bending of the blade structure during wind turbine operation. As a result, the flexible aeroshell extender piece 90 may be formed having less reinforcement requirements, resulting in a relatively lighter and more flexible construction than in the prior art, and which provides for relatively easy construction and assembly.

Preferably, the plurality of slits 88 are formed along at least 50% of the depth or chordwise length of the body of the aeroshell extender piece 90 from said trailing edge end 82 towards the first ends 72a,80a of the first and second panels 72,80 located at the blade extender 70. Preferably, the slits 88 extend between 50-90% of the depth of the body from said trailing edge end 82 towards said first ends 72a,80a, preferably approximately 80% of the depth of the body.

By providing slits 88 which extend along a majority of the depth of the aeroshell 90, but less than 100% of the depth, accordingly a flexible aeroshell 90 is provided which allows for trailing edge deformation and bending, and which is simultaneously securely attached to the blade extender 70 or other wind turbine blade portion. It also makes it possible to provide the aeroshell as a uniform piece, which is retrofitted to the inboard part of the blade, which may provide an relative simple attachment to the inboard part of the blade, while still providing a flexible solution alleviating loads.

The slits 88 may be formed using any suitable cutting action, e.g. machining, drilling, sawing, etc. Alternatively, it will be understood that the panels 70,80,84 may be formed having slots or apertures pre-formed in the panels themselves, wherein such slots or apertures are aligned during assembly of the aeroshell to collectively define the plurality of slits 88.

Preferably, the slits 88 are formed such that the aperture defined between opposed edges of the slits 88 is aerodynamically insignificant for the normal operation of the wind turbine blade. It will be understood that the slits 88 are dimensioned such that the aperture is small relative to the dimensions which would be required to affect the aerodynamic performance of the wind turbine blade profile, e.g. in respect of noise, lift/drag, etc.

In one advantageous aspect, it is found that the slits 88 are preferably dimensioned such that the width of the apertures provided by the slits is less than the designed boundary layer height in the area of the slits.

In a second advantageous aspect, the width of the apertures provided by the slits is less than the height of the laminar sublayer or the viscous sublayer in the area of the slits.

It will be understood that the dimensions of the slits 88 may vary along the longitudinal extent of the flexible aeroshell 86, dependent on the predicted normal operating conditions of the wind turbine blade along the length of the aeroshell. Preferably, the width of the apertures provided by the slits is less than 50 mm, further preferably less than 25 mm. In one embodiment, the slits have a gap width of approximately 15 mm.

Additionally or alternatively, the aeroshell extender piece 90 may comprises a flexible material (not shown) which is provided in or over the apertures or gaps defined by the plurality of slits 88. The flexible material may comprise any suitable material which is operable to cover or seal the apertures without significantly affecting the structural properties of the aeroshell extender piece, e.g. rubber, a flexible plastics material, canvas, etc. Additionally or alternatively, the aeroshell extender piece 90 may comprises brushes or bristles (not shown) provided at the gaps defined by the plurality of slits 88. The use of bristles or brushes at the slits can act to cover the gaps defined by the slits, and reduce any negative aerodynamic effects which may result by the presence of the slits at the trailing edge.

A relatively large aperture, preferably a circular aperture, may be provided at the end point 88a of each of the plurality of slits 88.

In one aspect, the end point apertures 88a may be formed in the panels 72,80 prior to the cutting of the plurality of slits 88, such that the end point apertures 88a provide an alignment point or visual indicator to an operator for the correct alignment of the slits 88. Additionally or alternatively, the end point apertures 88a may provide an access point for the introduction of a cutting device which can be used to cut said slits 88 into the body of the consolidated aeroshell extender piece 86, by cutting an aperture or slot from said end point aperture 88a to the trailing edge 82 of the consolidated aeroshell extender piece 86. The end point apertures 88a may be formed by a cutting or machining of the panels 72,80, and/or the apertures 88a may be formed integral to the panels 72,80 during a manufacturing of the said panels 72,80.

In a preferred embodiment, the plurality of reinforcement elements 78 are arranged within the interior of the aeroshell extender piece wherein a pair of reinforcement elements 78 are positioned on either side of and closely adjacent to each of the plurality of slits 88. Accordingly, each pair of reinforcement elements 78 may act to substantially seal off each effective trailing edge section of the flexible aeroshell 90 either side of the slits 88, to prevent ingress of debris, etc., into the interior of the aeroshell 90. In addition, the reinforcement elements 78 can act to provide structural strength to each effective trailing edge section.

While the first and/or second panels may be provided as substantially flat planar panel, it will be understood that more complex shapes may be used. For example, the panels 72,80 may be shaped to form a suitably curved pressure-side or suction-side surface, for example by providing a panel having a relatively concave or convex external surface. With reference to the cross-sectional view shown in FIG. 9, it can be seen that the first panel 72 is provided to have a relatively concavely-shaped externally-facing surface 73a, to form a portion of the pressure-side of the wind turbine blade aeroshell extender. Similarly, the second panel 80 may be provided as a planar panel or with a relatively small curvature to form a slightly convexly-shaped externally-facing surface 81a, to form a portion of the suction-side of the wind turbine blade aeroshell extender.

In addition, while the reinforcing elements 78 are preferably provided as bulkhead elements to substantially seal sections of the aeroshell 90, the reinforcing elements 78 may be provided with apertures 92 defined therein, to allow for drainage, pressure equalisation, etc., between opposite sides of the reinforcing elements 78.

It will be understood that the panels 72,80,84 and/or the reinforcing elements 78 may be formed as sandwich panel constructions, e.g. by the infusion of layers of a fibre material as a skin provided around an internal core material, e.g. balsa and/or low-density foam core material.

While the illustrated embodiments show the use of an aeroshell on a cylindrical blade extender, it will be understood that the aeroshell may be used on any other portion of a wind turbine blade, e.g. at the root end of a wind turbine blade, along a trailing edge section of a wind turbine blade, etc. Furthermore, while the illustrated embodiments show the manufacture and assembly of the aeroshell on a cylindrical blade extender, it will be understood that the aeroshell may be manufactured separately to an existing wind turbine blade component, the aeroshell configured to be subsequently retrofit to an existing component, e.g. a wind turbine blade having an inboard cylindrical part, e.g. having a circular, elliptical or oval cross-section.

In addition, while the illustrated embodiments show the use of additional profile wedges 74,76 to compensate for differences in the bonding surfaces of the blade extender 70 and the aeroshell panels 72,70, it will be understood that such compensatory profile wedges may be formed integrally with the portion of the wind turbine blade, e.g. the blade extender, to which it is desired to attach an aeroshell extender. In principle, it would also be possible to integrate the profile wedges in the aeroshell extender, which would alleviate loads in the glue bond to the surface of said portion of the wind turbine blade.

The manufacture and use of a flexible aeroshell extender piece blade as shown provides for improved operation of a wind turbine blade having such a flexible aeroshell, which is more able to resist operational bending forces along the blade trailing edge during the lifetime of the blade.

While the invention has previously been described with reference to an extender piece provided with integrated slits, it is clear that the profile wedges can be utilised for all types of extender pieces in order to achieve a larger glue bonding surface. Accordingly, the profile wedges may also be used for extender pieces without slits. According to the invention, the profile wedges are preferably adapted for attachment to an inboard part of the blade, where the curvature is relatively large (or in other words the radius of curvature is relatively low).

Figure 10:
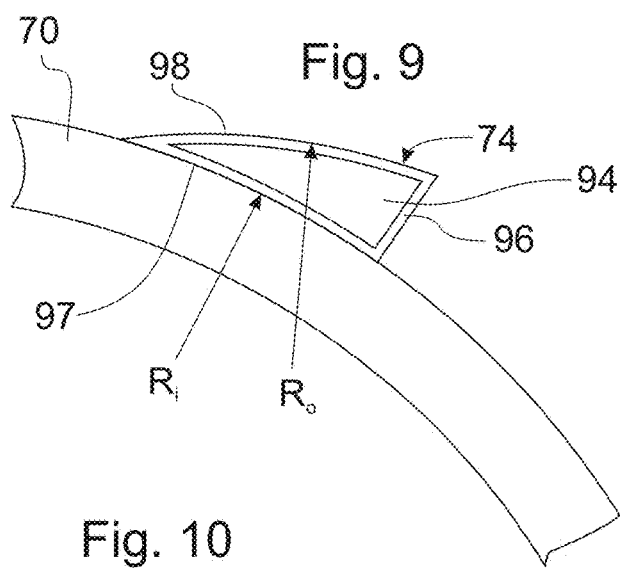
FIG. 10 illustrates a cross-sectional view of a profile wedge according to the invention.

The profile wedge 74 according to the invention is shown in more detail in FIG. 10. The profile wedge 74 is attached to the blade extender 70. The profile wedge 74 comprises an inner surface 97, which is attached to the blade extender 70, and an outer surface 98, for attachment of the body of the extender piece 90. The inner surface 97 has an inner radius of curvature $R_i$, and the outer surface has an outer radius of curvature $R_o$. The profile wedge 74 is advantageously designed such that the outer radius of curvature $R_o$ is larger than the inner radius of curvature R. Further, the outer surface 98 may have a larger area than the inner surface 97. Thereby, a more flat and larger bond surface may be provided for the attachment of the aeroshell extender piece 90. For a truly flat outer bonding surface, the outer radius of curvature $R_o$ approaches infinity. The profile wedge 74 may be formed as a composite structure having a core material 94, such as balsawood or foamed polymer, wrapped in a fibre-reinforcement material 96, e.g. glassfibre reinforced polymer.

The invention is not limited to the embodiments described herein, and may be modified or adapted without departing from the scope of the present invention.

The invention claimed is:

1. A wind turbine blade assembly comprising a wind turbine blade having a tip end and a root end, and a leading edge and a trailing edge with a chord length extending therebetween, wherein the wind turbine blade assembly further comprises an aeroshell extender piece comprising:

a body for attachment to a trailing edge side of a profile of a wind turbine blade, the body having a first end for attachment to the trailing edge side of the profile, and a second trailing edge end to form an extended airfoil trailing edge profile for a portion of the profile of the wind turbine blade, wherein the aeroshell extender piece is attached to the wind turbine blade at least partly using at least one profile wedge, the at least one profile wedge having an inner attachment surface and an outer attachment surface, the inner attachment surface being attached to a surface of the wind turbine blade and being contoured to mate therewith, and the outer attachment surface being attached to the aeroshell extender, the outer attachment surface having a larger surface area than a surface area of the inner attachment surface.

2. The wind turbine blade assembly according to claim 1, wherein the profile wedge is arranged between the aeroshell extender piece and the wind turbine blade.

3. The wind turbine blade assembly according to claim 1, wherein the aeroshell extender piece is attached to the wind turbine blade via two profile wedges.

4. The wind turbine blade assembly according to claim 1, wherein the inner attachment surface has a first radius of curvature and the outer attachment surface has a second radius of curvature, wherein the first radius of curvature is smaller than the second radius of curvature.

5. The wind turbine blade assembly according to claim 1, wherein the outer attachment surface is substantially planar or flat.

6. The wind turbine blade assembly according to claim 1, wherein the wind turbine blade comprises an inboard part and an outboard part, and wherein the aeroshell extender is attached to the inboard part of the blade.

7. The wind turbine assembly according to claim 6, wherein the inboard part of the wind turbine blade is formed having a substantially circular, elliptical or oval cross-section.

8. The wind turbine blade assembly according to claim 6, wherein the inboard part is cylindrical.

9. The wind turbine blade assembly according to claim 6, wherein the inboard part is a blade extender.

10. The wind turbine blade assembly according to claim 1, wherein the profile wedge is integrally formed with the wind turbine blade.

11. The wind turbine blade assembly according to claim 1, wherein the profile wedge is formed as a composite structure.

12. A wind turbine comprising a wind turbine blade or wind turbine blade assembly as claimed in claim 1.

13. A method of assembly of a wind turbine blade portion having a trailing edge extension, the method comprises the steps of:
providing a wind turbine blade portion having a leading edge side and a trailing edge side;
providing a pressure-side panel of an aeroshell extension piece;
providing a suction-side panel of an aeroshell extension piece;
attaching a first profile wedge to a first side of said wind turbine blade portion;
attaching a first of said pressure-side and suction-side panels to said wind turbine blade portion at least partly using said first profile wedge;
attaching a second profile wedge to a second side of said wind turbine blade portion; and
attaching a second of said pressure-side and suction-side panels to said wind turbine blade portion at least partly using said second profile wedge, wherein said pressure-side and suction-side panels form an aeroshell trailing edge extension for said wind turbine blade portion, and
wherein each of the first and second profile wedges has an inner attachment surface and an outer attachment surface, the inner attachment surface being attached to a surface of the wind turbine blade portion and being contoured to mate therewith, and the outer attachment surface being attached to the aeroshell extension piece, the outer attachment surface having a larger surface area than a surface area of the inner attachment surface.

14. The wind turbine assembly according to claim 7, wherein the inboard part of the wind turbine blade is formed as a load-carrying structure.

15. The wind turbine blade assembly according to claim 11, wherein the profile wedge comprises a core material wrapped in a fibre reinforcement skin.

16. The wind turbine blade assembly according to claim 15, wherein the core material is selected from the group consisting of balsawood and foamed polymer.

* * * * *